(12) United States Patent
Dudar et al.

(10) Patent No.: US 11,879,745 B2
(45) Date of Patent: Jan. 23, 2024

(54) SYSTEMS AND METHODS FOR FACILITATING A FINAL LEG OF A JOURNEY

(71) Applicant: Ford Global Technologies, LLC, Dearborn, MI (US)

(72) Inventors: Aed M. Dudar, Canton, MI (US); Fling Finn Tseng, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 399 days.

(21) Appl. No.: 16/933,039

(22) Filed: Jul. 20, 2020

(65) Prior Publication Data
US 2022/0018675 A1   Jan. 20, 2022

(51) Int. Cl.
| | |
|---|---|
| G01C 21/36 | (2006.01) |
| G01C 21/34 | (2006.01) |
| B64C 39/02 | (2023.01) |
| H04W 4/46 | (2018.01) |
| B25J 11/00 | (2006.01) |
| G06V 20/10 | (2022.01) |
| B64U 101/30 | (2023.01) |

(52) U.S. Cl.
CPC ......... *G01C 21/3602* (2013.01); *B25J 11/008* (2013.01); *B64C 39/024* (2013.01); *G01C 21/3407* (2013.01); *G06V 20/176* (2022.01); *H04W 4/46* (2018.02); *B64U 2101/30* (2023.01)

(58) Field of Classification Search
CPC .................................................. G01C 21/3602
See application file for complete search history.

(56) References Cited

U.S. PATENT DOCUMENTS

| | | | |
|---|---|---|---|
| 7,389,210 B2 | 6/2008 | Kagarlis | |
| 8,050,863 B2* | 11/2011 | Trepagnier | G05D 1/0274 |
| | | | 340/436 |
| 9,044,543 B2* | 6/2015 | Levien | B64C 39/024 |

(Continued)

OTHER PUBLICATIONS

Islam, Towhidul, et al., TaxSeeMe: A Taxi Administering System for the Visually Impaired, (https://ieeexplore.ieee.org/abstract/document/8628328), 2018 IEEE Vehicular Networking Conference (VNC) (Dec. 5, 2018) (Year: 2018).*

(Continued)

*Primary Examiner* — Jean Paul Cass
(74) *Attorney, Agent, or Firm* — Brandon Hicks; Eversheds Sutherland (US) LLP

(57) ABSTRACT

The disclosure is generally directed to systems and methods for facilitating travel over a last leg of a journey. In one example embodiment, an unmanned aerial vehicle (UAV) captures an image of an area to be traversed by an individual during the final leg of the journey. The image is evaluated to identify a hindrance that may be encountered by the individual in the area. A pre-emptive action may be taken to address the hindrance before reaching the area. The pre-emptive action, may, for example, include using the UAV and/or a terrestrial robot to assist the individual traverse the area. The assistance may be provided in various ways such as by use of the terrestrial robot to transport the individual and/or a personal item of the individual through the area, and/or by use of the UAV to provide instructions to guide the individual through the area.

18 Claims, 7 Drawing Sheets

(56) References Cited

U.S. PATENT DOCUMENTS

| | | | | |
|---|---|---|---|---|
| 9,061,102 | B2* | 6/2015 | Levien | A63H 27/12 |
| 9,576,460 | B2* | 2/2017 | Dayal | G08B 21/02 |
| 9,665,101 | B1 | 5/2017 | Templeton | |
| 9,696,165 | B2 | 7/2017 | Shin et al. | |
| 10,496,107 | B2* | 12/2019 | Pattison | H04W 4/02 |
| 2009/0073034 | A1* | 3/2009 | Lin | G01S 19/49 |
| | | | | 342/357.57 |
| 2010/0106356 | A1* | 4/2010 | Trepagnier | G05D 1/0248 |
| | | | | 701/25 |
| 2012/0316725 | A1* | 12/2012 | Trepagnier | G01S 17/931 |
| | | | | 701/26 |
| 2016/0078759 | A1* | 3/2016 | Nerayoff | G08G 1/0175 |
| | | | | 701/3 |
| 2016/0330601 | A1* | 11/2016 | Srivastava | H04W 4/90 |
| 2017/0018193 | A1* | 1/2017 | Gordon | G01C 21/3407 |
| 2017/0147951 | A1 | 5/2017 | Meyer et al. | |
| 2017/0174343 | A1* | 6/2017 | Erickson | A61B 5/165 |
| 2017/0351995 | A1 | 12/2017 | Fletcher | |
| 2018/0029706 | A1* | 2/2018 | Baruch | B64U 20/80 |
| 2019/0171208 | A1* | 6/2019 | Magalhães de Matos | |
| | | | | G05D 1/0027 |
| 2020/0019761 | A1* | 1/2020 | Kang | G08G 1/096833 |
| 2020/0066155 | A1* | 2/2020 | Rosenblatt | G08G 1/142 |
| 2020/0249673 | A1* | 8/2020 | Fleishman | G06K 19/06065 |
| 2020/0349617 | A1* | 11/2020 | Rosas-Maxemin | G06N 3/045 |
| 2022/0066456 | A1* | 3/2022 | Ebrahimi Afrouzi | |
| | | | | B25J 9/1697 |
| 2022/0169401 | A1* | 6/2022 | Di Cosola | B64F 1/32 |
| 2022/0187841 | A1* | 6/2022 | Ebrahimi Afrouzi | |
| | | | | G05D 1/0242 |

OTHER PUBLICATIONS

Machine Translation of Chinese Patent Pub. No. CN110549352A to Shenzhen Silver (Year: 2019).*

"Urban Mobility: Getting Around Stress-Free," Kathrin Wildemann, Dec. 7, 2017; Web page <https://www.zf.com/mobile/en/stories_3139.html>, 6 pages, retrieved from the internet on Oct. 19, 2020.

* cited by examiner

SYSTEMS AND METHODS FOR FACILITATING A FINAL LEG OF A JOURNEY

FIELD OF THE DISCLOSURE

This disclosure generally relates to the use of robotic vehicles to facilitate travel over a final leg of a journey.

BACKGROUND

The phrase "last mile" generally refers to a relatively short distance that must be traversed as a final leg of a journey. For example, the last mile can refer to a walking distance from a subway station to a house, or a bicycle ride from a bus depot to an office. In some cases, the last mile can be a final leg of a journey through an unfamiliar area, such as may be encountered by a tourist in a foreign country. As such, the last mile can pose various types of challenges, including a lack of knowledge of an area, lack of appropriate transport, and/or encountering route changes due to road work, construction, or a traffic accident. These challenges may be compounded when an individual, such as a mother carrying an infant, or a tourist hauling a suitcase, has to traverse the last mile to reach his/her destination. Some makeshift solutions, such as hailing a taxi or calling a friend to provide a ride, may be used in some cases. However, such solutions may be unreliable, inconvenient, and/or expensive at times. It is therefore desirable to provide better solutions.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
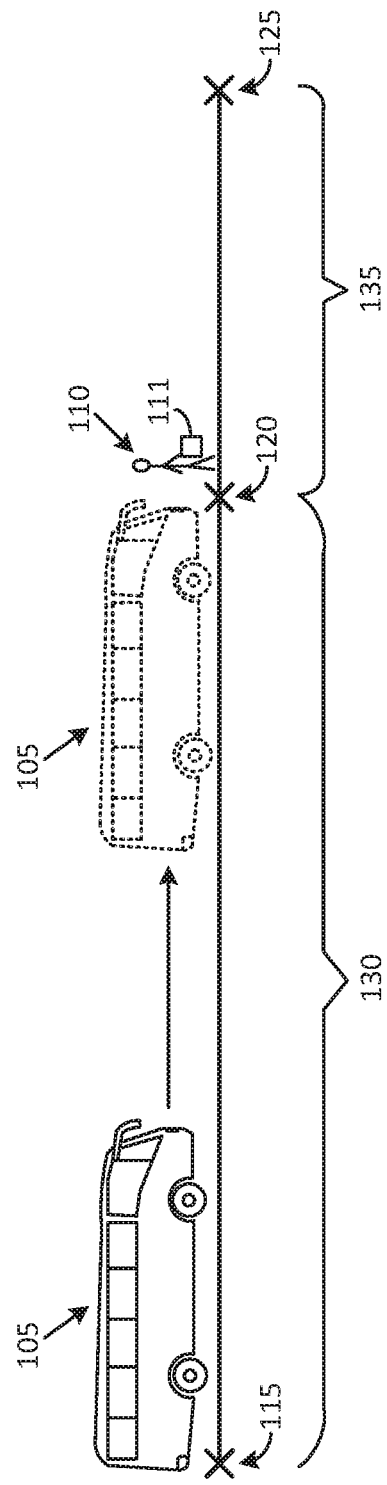
FIG. 1 illustrates an example scenario in which an individual is faced with challenges in traversing a last mile portion of a journey.

In terms of a general overview, certain embodiments described in this disclosure are directed to systems and methods for facilitating travel over a last leg of a journey. In one example embodiment, an unmanned aerial vehicle captures an image of an area to be traversed by an individual during the final leg of the journey. The image is evaluated to identify a hindrance that may be encountered by the individual in the area and a pre-emptive action taken to address the hindrance, before reaching the area. The pre-emptive action, may, for example, include using the UAV and/or a terrestrial robot to assist the individual traverse the area. The assistance may be provided in various ways such as by use of the terrestrial robot to transport the individual and/or a personal item of the individual through the area, and/or use of the UAV to provide instructions to guide the individual through the area.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular component such as a first processor in a first computer may be performed by another component such as a second processor in another computer. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and terms are used herein solely for convenience and such words and terms should be interpreted as referring to various objects and actions that are generally understood in various forms and equivalencies by persons of ordinary skill in the art. For example, words such as "object" and "item" can be used interchangeably. The phrase "robotic vehicle" as used herein can refer to any type of autonomous or semi-autonomous vehicle that moves through the air, ground, or water. The phrase "unmanned aerial vehicle (UAV)" as used herein may be referred to as an "aerial drone" or "drone" in popular parlance. The phrase "terrestrial robot" as used herein pertains to any robotic vehicle that is configured to travel over ground or water either autonomously or under control of a human being. In some cases, the human being may operate a terrestrial robot from a remote location (for example, by using imaging devices and wireless communication) or may accompany the terrestrial robot (for example, by using a wired connection to control movements of the terrestrial robot). It should also be understood that the word "example" as used herein is intended to be non-exclusionary and non-limiting in nature.

FIG. 1 illustrates an example scenario in which an individual 110 is faced with challenges in traversing a last mile portion of a journey to a destination 125. In this example scenario, the individual 110 has traveled by bus 105 from an originating location 115 to an intermediate location 120 en route to the destination 125. In other scenarios, other forms of transport may be used such as, for example, a train, a car, a motorcycle, a boat, or a ship, and the journey from the originating location 115 to the intermediate location 120 may involve multiple legs, and/or the use of more than one vehicle. The distance 130 between the originating location 115 and the intermediate location 120 is typically large in comparison to the distance 135 between the intermediate location 120 and the destination 125. The terrain between the intermediate location 120 and the destination 125 may be referred to herein variously as a last mile area, a final leg, or a last mile.

In the example scenario shown in FIG. 1, the individual 110 is carrying a personal item 111 upon alighting from the bus 105. A few examples of personal item 111 may include a package, a suitcase, an infant, a stroller, a bicycle, a skateboard, and a scooter. In some cases, the individual 110 may be a handicapped individual requiring a wheelchair for mobility. The personal item 111 in this case, can be a wheelchair or a walking aid.

The individual 110 may be traveling in a foreign country and may lack information about the last mile, such as, for example, whether any transportation (taxi, rental car, or shuttle bus, etc.) is available, whether the terrain is walkable (hilly, obstacles, heavy traffic, no-pedestrian zones, etc.), and whether handicap-friendly structures (such as wheelchair ramps and wide entryways) are provided. Such features, facilities, objects, and features may constitute hindrances. It would be beneficial if the individual 110 is provided such information and allowed to take some pre-emptive actions where feasible, prior to reaching the intermediate location 120.

Figure 2:
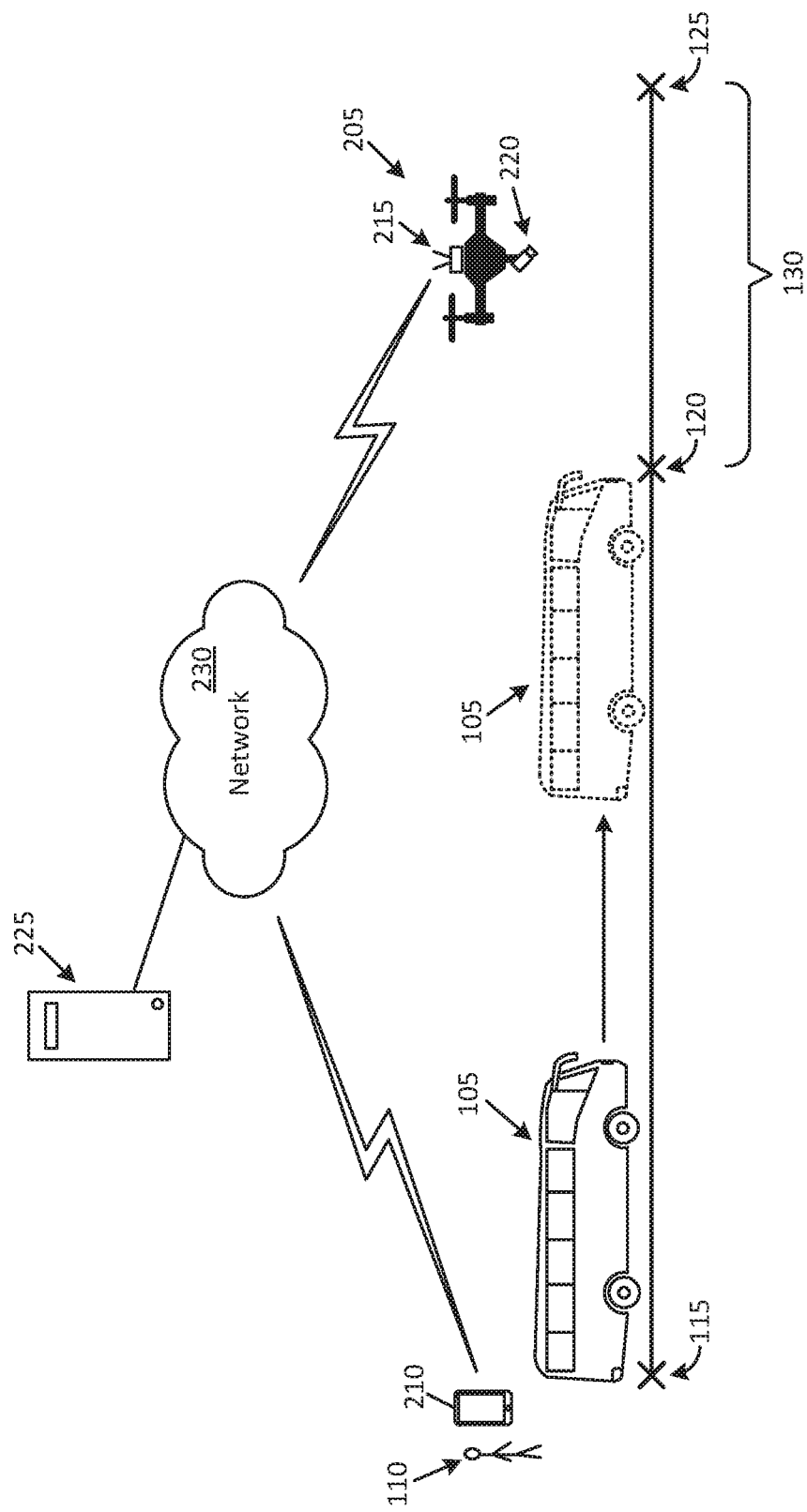
FIG. 2 illustrates a first example scenario in which an unmanned aerial vehicle (UAV) is used for capturing images of a last mile area in accordance with an embodiment of the disclosure.

FIG. 2 illustrates a first example scenario in which a UAV 205 is used to gather information pertaining to the last mile area and transmit the information to the individual 110 before the individual reaches the intermediate location 120. In one embodiment, gathering information of the last mile area can involve capturing images of some or all portions of the last mile area in accordance with an embodiment of the disclosure. The images may be captured and provided in various formats, such as, for example, in the form of a digital image, a video clip, a sonar image, a LIDAR (light detection and ranging) image, and a topographical map.

The images may be used by the individual 110 to take pre-emptive action in order to overcome a hindrance that may be present in the last mile portion of the journey. In some cases, the images may be provided to the individual 110 prior to the individual 110 commencing on his/her journey from originating location 115. In some other cases, the information may be provided to the individual 110 while the individual 110 is traveling on the bus 105 from the originating location 115 to the intermediate location 120.

The UAV 205 may include an imaging system 220 that is used to capture images and/or video clips of the terrain and of objects that may be present over the last mile. The imaging system 220 can include various types of devices such as a digital camera, a video camera, a sonar device, or a LIDAR device, and may also include processing circuitry that can process and/or manipulate the images to make the images meaningful for use by the individual 110.

The terrain over the last mile may include, for example, a road having a steep incline, an unpaved street, a cobble-stoned pathway, a pond, and/or a flooded creek. Objects present in the last mile can include various man-made objects such as a building, a structure, a wheelchair ramp, a stairway, and/or a pedestrian walkway when the last lime area is an urban area. Some of the objects may be stationary objects (such as a building) while others (such as a vehicle) may be mobile objects.

The images captured by the imaging system 220 may be wirelessly transmitted from the UAV 205 (by a wireless transponder 215) to various devices such as a server computer 225 and a smartphone 210 that is carried by the individual 110, via a network 230. The network 230 may include any one or a combination of various networks such as a cellular network, a telephone network, a cable network, a wireless network, and/or private/public networks such as the Internet. The server computer 225 may be communicatively coupled to the network 230 wirelessly or via a wired medium.

The smartphone 210 carried by the individual 110 can include a software application that performs various operations in accordance with the disclosure. In some cases, some of these operations may be carried out in cooperation with the server computer 225. Towards this end, the smartphone 210 may utilize various types of wireless communication protocols to communicate with the server computer 225 via the network 230. The software application may also receive images and/or video clips from the UAV 205 in various formats such as, for example, as raw images, as digital images, and/or as processed images (a contour map, a rendered image, etc.). In some cases, the images and/or video clips may be received in real time or in near-real time, so that the individual 110 can evaluate the images to identify any hindrances that may be present in the last mile.

For example, an image may show a flight of stairs that is a part of a first building which the individual 110 may have to go through to reach the destination 125. The destination 125 may be a second building, for example. The flight of stairs may constitute a hindrance in view of the use of a wheelchair by the individual 110 who is physically handicapped. The individual 110 may further evaluate the image to identify an alternative path that avoids having to use the flight of stairs. The act of identifying the alternative path constitutes a pre-emptive action that the individual 110 is taking prior to embarking on the journey or while traveling on the bus 105.

As another example, an image may show a steep hill that the individual 110 may have to climb in order to reach the destination 125 (a house, for example). The steep hill may constitute a hindrance because the individual 110 has to push a stroller with an infant onboard. The individual 110 may further evaluate the image to identify an alternative method of travel such as the use of a taxi from the intermediate location 120 to the destination 125. The act of deciding to take the taxi constitutes a pre-emptive action that the individual 110 is taking prior to embarking on the journey, or while traveling on the bus 105.

As yet another example, an image may show that there is standing water near the intermediate location 120, probably as a result of heavy rain or flooding. The individual 110 may decide to purchase a pair of galoshes before getting on the bus 105. The purchase of the galoshes constitutes a preemptive action that the individual 110 is taking prior to embarking on the journey.

Figure 3:
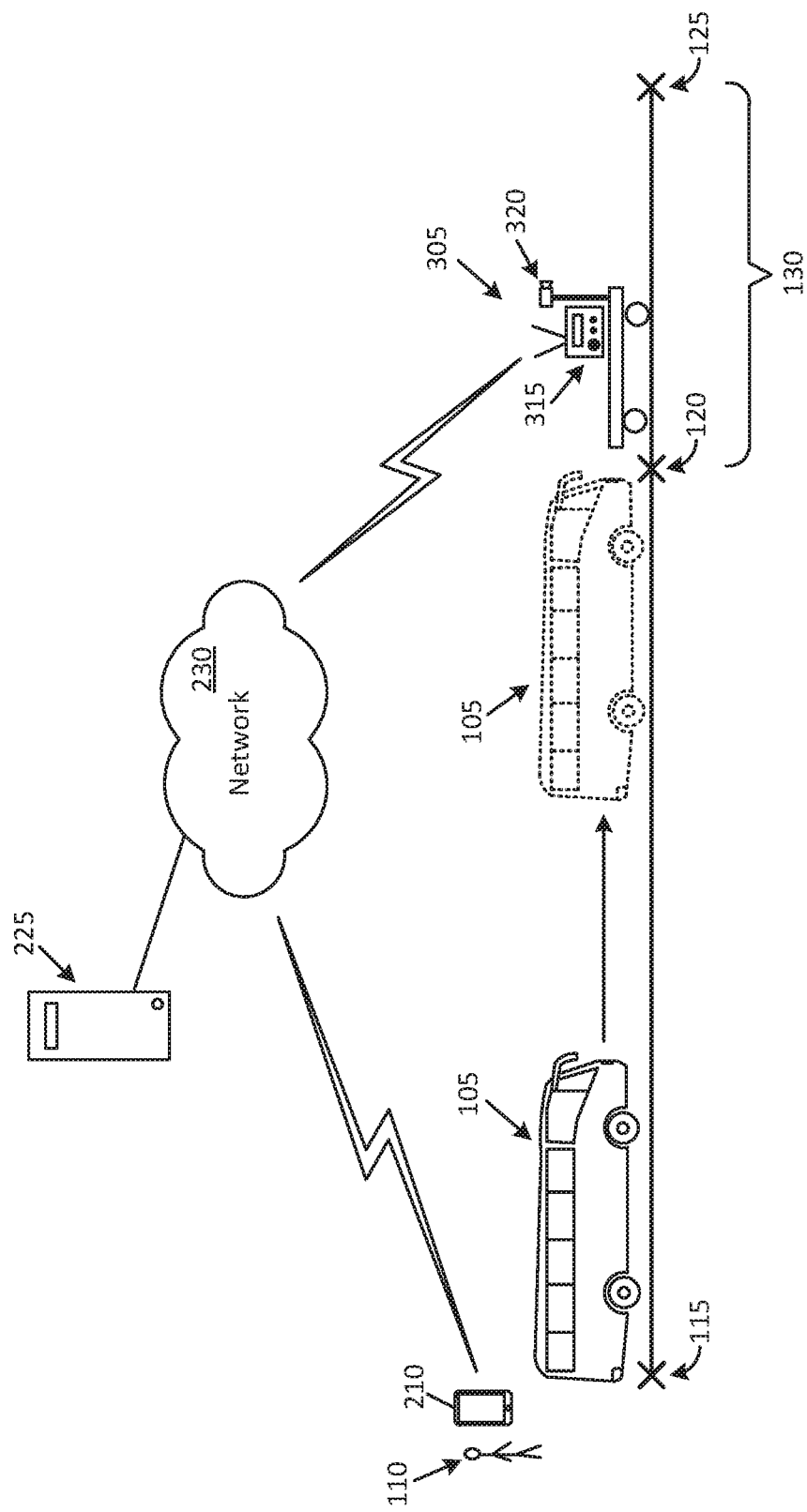
FIG. 3 illustrates a second example scenario in which a terrestrial robot is used for scouting and/or capturing images of a last mile area in accordance with an embodiment of the disclosure.

FIG. 3 illustrates a second example scenario in which a terrestrial robot 305 is used for scouting and/or capturing images of a last mile area in accordance with an embodiment of the disclosure. The information obtained via the results of the scouting and/or via captured images may be transmitted to the smartphone 210 of the individual 110 (and/or to the server computer 225) by a wireless transponder 315 that is provided in the terrestrial robot 305. The terrestrial robot 305, which can be a robot having wheels in one case and a robot having legs in another case, may provide various types of terrain information because the wheels or the legs make direct contact with the terrain (such as the presence of gravel, cobblestones, slippery surface etc.). Information pertaining to the terrain may be transmitted to the smartphone 210 in various forms such as in the form of images, cautionary messages, and/or quantitative data.

An imaging system 320 that may be provided in the terrestrial robot 305 for capturing images that can provide a ground-level view of objects likely to cause a hindrance to the individual 110 when traversing the last mile. The scouting information and/or the images may be used by the individual 110 to take a pre-emptive action in order to overcome a hindrance that may be present in the last mile area. In some cases, the information and/or images may be provided to the individual 110 prior to the individual 110 commencing on his/her journey from originating location 115. In some other cases, the information and/or images may be provided to the individual 110 while the individual 110 is traveling on the bus 105 from the originating location 115 to the intermediate location 120.

The description above pertains to the use of the UAV 205 and the terrestrial robot 305 to obtain information about the last mile. In some other implementations, one or more humans may traverse the last mile area to obtain information and transmit the information to the smartphone 210 of the individual 110. A human volunteer may be monetarily incentivized to simulate travel by the individual 110 over the last mile. The simulation may involve replicating various actions that the individual 110 may carry out when traversing from the intermediate location 120 the destination 125. In some cases, the human volunteer may accompany the terrestrial robot 305 in order to evaluate the use of the terrestrial robot 305 for functions such as carrying the personal item 111 of the individual 110.

Figure 4:
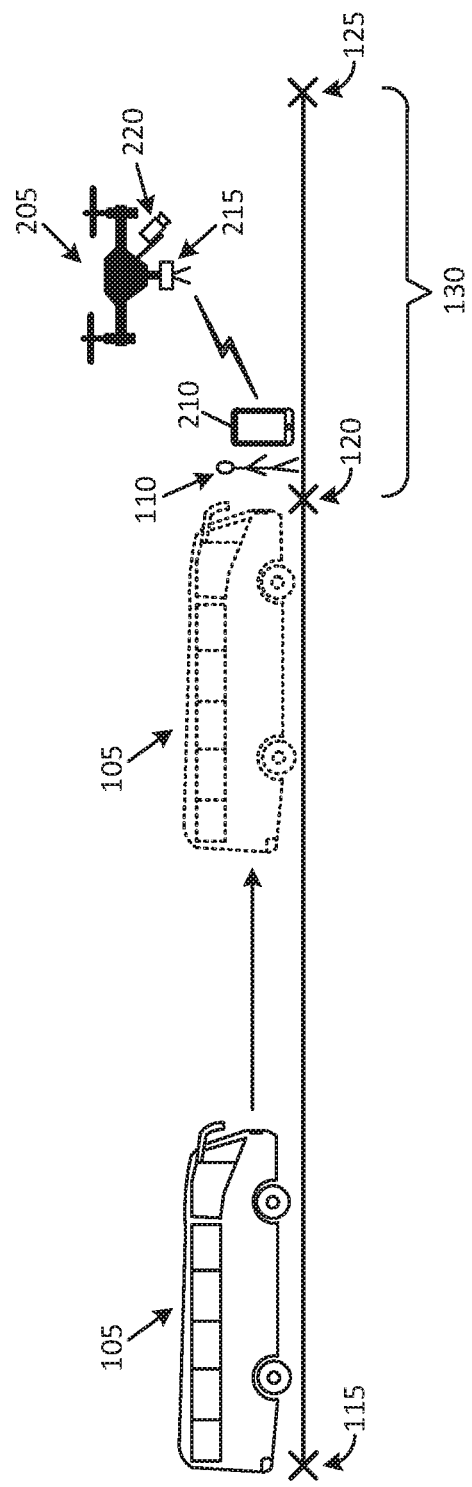
FIG. 4 illustrates a third example scenario in which a UAV provides a first form of assistance to an individual to traverse a last mile portion of a journey in accordance with the disclosure.

FIG. 4 illustrates a third example scenario in which the UAV 205 provides a first form of assistance to the individual 110 when the individual 110 traverses the last mile portion of the journey, in accordance with the disclosure. The individual 110 has exited the bus 105 at the intermediate location 120 and may use the smartphone 210 to communicate with the wireless transponder 215 provided in the UAV 205 for seeking the assistance of the UAV 205. In this example, the UAV 205 may fly ahead of the individual 110 and capture images or video of the last mile area. In some cases, a video clip may be transmitted from the wireless transponder 215 to the smartphone 210 in real time, or in near-real time. The individual 110 may watch the video on his/her smartphone 210 and identify a hindrance in his/her path, such as, for example, a road with heavy traffic flow or construction work. The individual 110 may then take preemptive action in order to overcome the hindrance, such as, for example, taking an alternative route.

In another example, the UAV 205 may provide travel guidance to the individual 110 by transmitting instructions and/or information to the smartphone 210. The instructions may, for example, advice the individual 110 to turn left and walk along a particular road, then turn right into a building, and so on.

Figure 5:
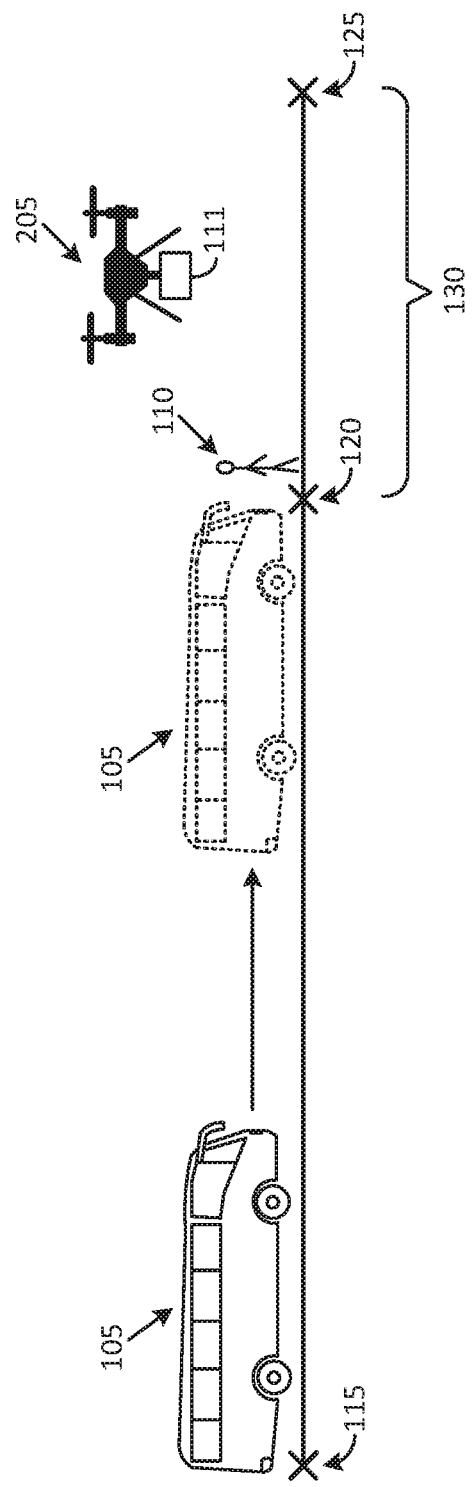
FIG. 5 illustrates a fourth example scenario in which a UAV provides a second form of assistance to an individual to traverse a last mile portion of a journey in accordance with the disclosure.

FIG. 5 illustrates a fourth example scenario in which the UAV 205 provides a second form of assistance to the individual 110 when traversing the last mile portion of the journey in accordance with the disclosure. The individual 110 has exited the bus 105 at the intermediate location 120 with a personal item 111 such as, for example, a package, or a piece of luggage. The individual 110 then uses the smartphone 210 to communicate with the wireless transponder 215 provided in the UAV 205 for requesting help in transporting the personal item 111 to the destination 125.

In one example application, a computer system provided in the UAV 205 may evaluate a characteristic of the personal item 111, and take a pre-emptive action based on the characteristic of the personal item 111. For example, when the personal item 111 is a heavy package, the computer system may inform personnel to configure the UAV 205 for lifting and transporting the heavy package. In another case, the individual 110 may assess the capabilities of the UAV 205 based on a characteristic of the personal item and take preemptive action, such as, arranging for a particular type of UAV 205 or declining the use of the UAV 205 (for example, when the personal item 111 is a wheel chair). In yet another case, the pre-emptive action may involve the individual 110 selecting a travel path through the last mile area based on the personal item 111, when the personal item 111 is an item such as a personal transportation vehicle, an infant stroller, or a wheelchair.

The UAV 205 may land near the individual 110 and allow the individual 110 to attach the personal item 111 to the UAV 205, or to place the personal item 111 on a platform provided in the UAV 205. The UAV 205 then flies ahead of, behind, or besides, the individual 110, while carrying the personal item 111, thus freeing the individual 110 to walk unencumbered towards the destination 125. The UAV 205 may also perform other actions such as, for example, guiding the individual 110 towards the destination 125 or providing illumination for helping the individual 110 watch out for obstacles when the last mile area is in darkness.

Figure 6:
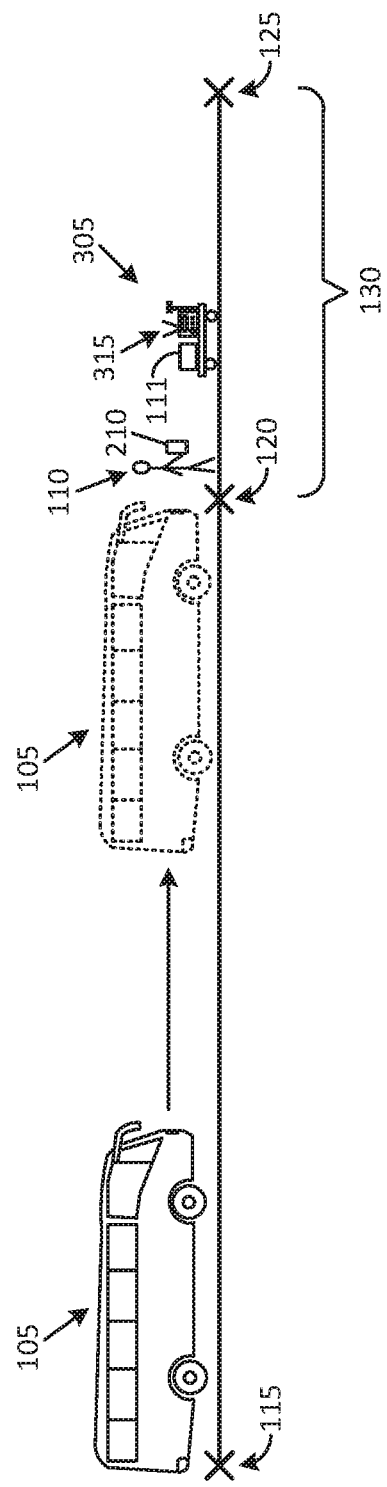
FIG. 6 illustrates a fifth example scenario in which a terrestrial robot assists an individual traverse a last mile portion of a journey in accordance with the disclosure.

FIG. 6 illustrates a fifth example scenario in which the terrestrial robot 305 assists the individual 110 traverse the last mile portion of the journey in accordance with the disclosure. The terrestrial robot 305 in this application may be referred to as a collaborative robot (cobot). The collaborative robot may be the same terrestrial robot 305 that was used to scout and/or capture images of the last mile area or can be a different robot that is adapted for performing collaborative tasks.

The individual 110 has exited the bus 105 at the intermediate location 120 with a personal item 111 such as, for example, a package or a piece of luggage. The individual 110 may then use a software application in the smartphone 210 to summon the terrestrial robot 305 by communicating with the wireless transponder 315. The terrestrial robot 305 may approach the individual 110 and allow the individual 110 to load the personal item 111 upon a platform of the terrestrial robot 305. The terrestrial robot 305 then moves ahead of, behind, or besides, the individual 110, while carrying the personal item 111, thus freeing the individual 110 to walk unencumbered towards the destination 125. The terrestrial robot 305 may also perform other actions such as, for example, guiding the individual 110 towards the destination 125 or providing illumination for helping the individual 110 watch out for obstacles when the last mile area is in darkness.

Figure 7:
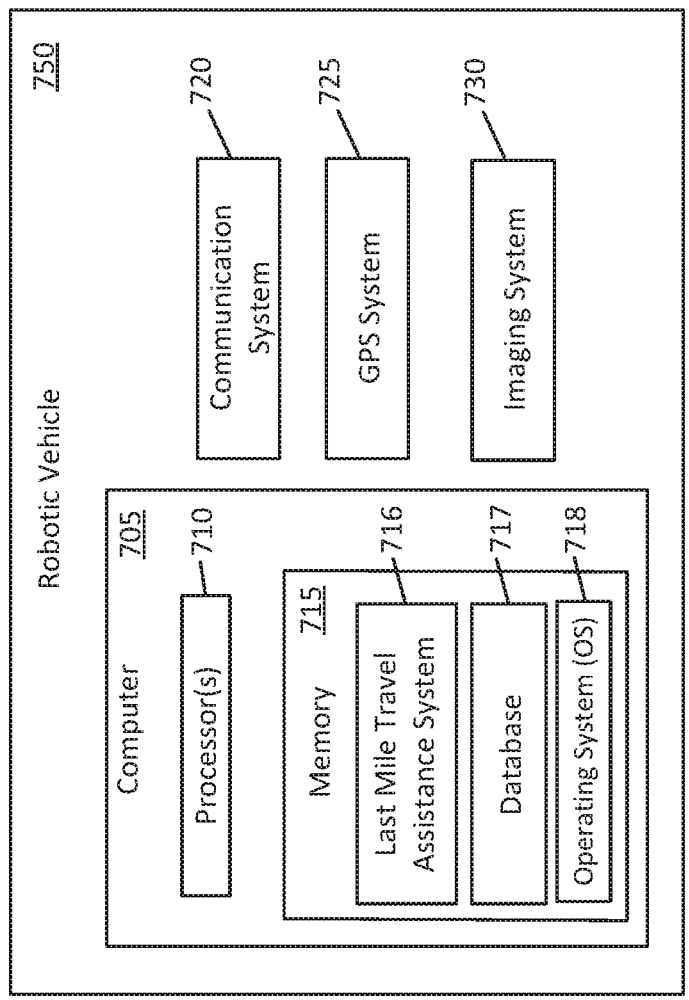
FIG. 7 illustrates some example components that may be included in a robotic vehicle configured to assist an individual traverse a last mile portion of a journey in accordance with the disclosure.

FIG. 7 illustrates some example components that may be included in a robotic vehicle 750 configured to assist the individual traverse a last mile portion of a journey in accordance with the disclosure. The robotic vehicle 750 can be any of various types of vehicles such as, for example, the UAV 205 and the terrestrial robot 305 described above. The example components of the robotic vehicle 750 may include a communication system 720, a GPS system 725, and a computer 705. The communication system 720 can include one or more wireless transponders such as, for example, a Wi-Fi transponder or a cellular transponder. The Wi-Fi transponder or cellular transponder allows the robotic vehicle 750 to communicate with components such as for example, the smartphone 210 of the individual 110 and/or the server computer 225 (via the network 230).

The GPS system 725 may be configured to provide GPS coordinates to the computer 705. The computer 705 may then use the GPS coordinates to guide the individual 110 through the last mile area. The imaging system 730 can include one or more cameras, such as, for example, a digital camera and/or a video camera, for capturing images of the last mile area in accordance with the disclosure.

The computer 705 can include a processor(s) 710 and a memory 715. The memory 715, which is one example of a non-transitory computer-readable medium, may be used to store an operating system (OS) 718, a database 717, and various code modules such as a last mile travel assistance system 716. The code modules are provided in the form of computer-executable instructions that can be executed by the processor(s) 710 for performing various operations in accordance with the disclosure.

The last mile travel assistance system 716, which can be a software application that is downloaded into a smartphone, may be executed by the processor(s) 710 for performing various operations related to assisting the individual 110 traverse the last mile area in accordance with the disclosure. The database 717 may be used to store information such as about the last mile area, about items that may be carried by an individual (such as the individual 110), and personal preferences of individuals (such as the individual 110).

The memory 715 can include any one memory element or a combination of volatile memory elements (e.g., random access memory (RAM, such as DRAM, SRAM, SDRAM, etc.)) and non-volatile memory elements (e.g., ROM, hard drive, tape, CD ROM, etc.). Moreover, the memory device may incorporate electronic, magnetic, optical, and/or other types of storage media. In the context of this document, a "non-transitory computer-readable medium" can be, for example, but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

In the context of software, the operations described herein with respect to computers, such as the computer 705, may be implemented by computer-executable instructions stored on one or more non-transitory computer-readable media such as the memory 715, that, when executed by one or more processors such as the processor(s) 710, perform the recited operations. Generally, computer-executable instructions include routines, programs, objects, components, data structures, and the like that perform particular functions or implement particular abstract data types.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and memory, as discussed herein.

An implementation of the devices, systems, and methods disclosed herein may communicate over a computer network. A "network" and a "bus" is defined as one or more data links that enable the transport of electronic data between computer systems and/or modules and/or other electronic devices. When information is transferred or provided over a network, a bus, or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced using various devices including personal computers, desktop computers, laptop computers, message processors, handheld devices, multi-processor systems, microprocessor-based or programmable consumer electronics, mobile telephones, PDAs, tablets, pagers, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
capturing, with a user device, a first image of an area to be traversed by an individual with an unmanned aerial vehicle (UAV) or a terrestrial robot during a final leg of a journey of the individual;
evaluating the first image with the user device to identify a hindrance;
determining a pre-emptive action to be carried out for overcoming the hindrance;
executing the pre-emptive action prior to reaching an intermediate location within the area;
receiving, by the UAV or the terrestrial robot, a summoning command from a device of the individual, the summoning command indicating that the UAV or the terrestrial robot should traverse to the intermediate location;
evaluating one or more characteristics of an item from the individual that is to be transported by the UAV or the terrestrial robot over the area during the final leg of the journey of the individual, wherein the one or more characteristics comprise a weight and a size of the item;
determining that the item is a package;
executing the pre-emptive action to either: a) select the UAV or the terrestrial robot from a plurality of UAVs and a plurality of terrestrial robots because the UAV or the terrestrial robot is particularly configured for the package and the other of the plurality of UAVs and the plurality of the terrestrial robots are not configured for the package because the weight of the package is too heavy, or b) decline to use the UAV or the terrestrial robot because the weight of the package is too heavy for the UAV or the terrestrial robot; and
if executing the pre-emptive action is a):
securing the package from the individual to the UAV or the terrestrial robot; and
traversing, by the UAV or the terrestrial robot, the final leg of the journey of the individual along with the individual starting from the intermediate location, wherein the package is transported by the UAV or the terrestrial robot during the final leg of the journey of the individual.

2. The method of claim 1, wherein the area is an urban area comprising a man-made object, and wherein the first image is captured by the UAV or the terrestrial robot equipped with a camera.

3. The method of claim 2, wherein the UAV or the terrestrial robot is a drone aircraft and the man-made object is one of a wheelchair ramp, a stairway, a part of a building, or a pedestrian walkway.

4. The method of claim 1, further comprising:
determining the area to be traversed by the individual is in darkness; and
illuminating, by the UAV or the terrestrial robot, the area to be traversed by the individual.

5. The method of claim 1, wherein the package is one of a personal transportation vehicle, an infant stroller, or a wheelchair, wherein executing the pre-emptive action is a), and further comprises selecting a travel path through the area based on the one of the personal transportation vehicle, the infant stroller, or the wheelchair.

6. The method of claim 1, further comprising:
communicating with the UAV or the terrestrial robot upon reaching the area; and
obtaining assistance from the UAV or the terrestrial robot to traverse the area.

7. The method of claim 6, wherein the communicating is carried out by operating the smartphone, and wherein the UAV or the terrestrial robot is a collaborative robot (cobot).

8. The method of claim 6, wherein the UAV or the terrestrial robot is a drone aircraft configured to assist an individual traverse the area.

9. A method comprising:
providing a first unmanned aerial vehicle (UAV) or a first terrestrial robot;
providing a smartphone of an individual;
reaching, by the individual, an area to be traversed during a final leg of a journey of the individual, wherein reaching the area comprises the individual exiting a mode of transportation;
transmitting, by operating the smartphone, a summoning command for the first UAV or the first terrestrial robot to traverse to the area;
evaluating one or more characteristics of an item from the individual that is to be transported by the first UAV or the first terrestrial robot over the area during the final leg of the journey of the individual, wherein the one or more characteristics comprise a weight and a size of the item;
determining that the item is a heavy package;
either selecting the first UAV or the first terrestrial robot from a plurality of UAVs and a plurality of terrestrial robots because the first UAV or the first terrestrial robot is particularly configured for the heavy package and the other of the plurality of UAVs and the plurality of the terrestrial robots are not configured for the heavy package because the weight of the heavy package is too heavy, or declining to use the first UAV or the first terrestrial robot because the weight of the heavy package is too heavy for the UAV or the terrestrial robot; and
if the first UAV or the first terrestrial robot is selected because the first UAV or the first terrestrial robot is particularly configured for the heavy package,
securing the heavy package from the individual to the first UAV or the first terrestrial robot; and
accompanying, by the first UAV or the first terrestrial robot, the individual as the individual traverses the final leg of the journey of the individual, wherein the heavy package is transported by the first UAV or the first terrestrial robot.

10. The method of claim 9, wherein the first UAV or the first terrestrial robot is a collaborative robot (cobot) configured to one of transport or guide an individual across the area.

11. The method of claim 9, further comprising:
capturing a first image of the area;
examining the first image to identify a pre-emptive action to be carried out for traversing the area; and
executing the pre-emptive action prior to reaching the area.

12. The method of claim 11, wherein the area is an urban area comprising a man-made object, and wherein the first image is captured by a second robotic vehicle equipped with a camera.

13. The method of claim 12, wherein the second robotic vehicle is a drone aircraft and the man-made object is one of a wheelchair ramp, a stairway, a part of a building, or a pedestrian walkway.

14. A system comprising:
a smartphone; and
a unmanned aerial vehicle (UAV) or a terrestrial robot wirelessly connected to the smartphone, the UAV or the terrestrial robot comprising:
a memory that stores computer-executable instructions; and
a processor configured to access the memory and execute the computer-executable instructions to at least:
receive, by the processor, a summoning command from the smartphone, the summoning command indicating that the UAV or the terrestrial robot should traverse to an intermediate location within an area to meet the individual, wherein the individual arrived at the intermediate location by exiting a mode of transportation, and wherein the intermediate location is a starting point of a final leg of a journey of the individual;
traverse to the intermediate location in response to the summoning command;
evaluate one or more characteristics of the item that is to be transported over the area during the final leg of the journey of the individual, wherein the one or more characteristics comprise a weight and a size of the item;
determine that the item is a heavy package; and
execute the pre-emptive action to either: a) select the UAV or the terrestrial robot from a plurality of UAVs and a plurality of terrestrial robots because the UAV or the terrestrial robot is particularly configured for the heavy package and the other of the plurality of UAVs and the plurality of the terrestrial robots are not configured for the heavy package because the weight of the heavy package is too heavy, or b) decline to use the UAV or the terrestrial robot because the weight of the heavy package is too heavy for the UAV or the terrestrial robot; and
if execute the pre-emptive action is a):
provide travel assistance in response to the summoning command, the travel assistance comprising guidance instructions for the individual to reach a destination, transportation of the heavy package through the area to the destination, and accompanying the individual through the area from the intermediate location to the destination.

15. The system of claim 14, wherein the area is an urban area comprising a man-made object, and wherein the UAV or the terrestrial robot is one of a drone aircraft configured to guide an individual across the area or a collaborative robot (cobot) configured to transport the heavy package across the area.

16. The system of claim 15, wherein the man-made object is one of a wheelchair ramp, a stairway, a part of a building, or a pedestrian walkway.

17. The system of claim 15, wherein the drone aircraft is configured to provide guidance to the individual by transmitting messages to a smartphone.

18. The system of claim 15, wherein the item transported by the collaborative robot comprises a baggage or a package.

* * * * *